(12) United States Patent
Dheer et al.

(10) Patent No.: US 10,013,665 B2
(45) Date of Patent: Jul. 3, 2018

(54) BUSINESS-TO-BUSINESS (B2B) MONITORING AND INFORMATION EXCHANGE NETWORK SYSTEM

(71) Applicants: Sanjeev Dheer, Mountain View, CA (US); Christopher Marino, Mountain View, CA (US); Gregory David Smelker, Mountain View, CA (US); Shailesh Arun Alawani, Mountain View, CA (US); Nitesh Gupta, Mountain View, CA (US)

(72) Inventors: Sanjeev Dheer, Mountain View, CA (US); Christopher Marino, Mountain View, CA (US); Gregory David Smelker, Mountain View, CA (US); Shailesh Arun Alawani, Mountain View, CA (US); Nitesh Gupta, Mountain View, CA (US)

( * ) Notice: Subject to any disclaimer, the term of this patent is extended or adjusted under 35 U.S.C. 154(b) by 0 days.

(21) Appl. No.: 15/394,782

(22) Filed: Dec. 29, 2016

(65) Prior Publication Data

US 2017/0270441 A1    Sep. 21, 2017

Related U.S. Application Data

(60) Provisional application No. 62/272,763, filed on Dec. 30, 2015.

(51) Int. Cl.
| | | |
|---|---|---|
| *G06F 3/00* | (2006.01) | |
| *G06F 9/44* | (2018.01) | |
| *G06F 9/46* | (2006.01) | |
| *G06F 13/00* | (2006.01) | |
| *G06Q 10/06* | (2012.01) | |
| *G06Q 50/00* | (2012.01) | |
| *G06F 17/30* | (2006.01) | |

| | | |
|---|---|---|
| *H04L 29/08* | (2006.01) | |
| *G06F 21/62* | (2013.01) | |

(52) U.S. Cl.
CPC ... *G06Q 10/0635* (2013.01); *G06F 17/30864* (2013.01); *G06Q 10/06395* (2013.01); *G06Q 50/01* (2013.01); *H04L 67/306* (2013.01); *G06F 21/6245* (2013.01)

(58) Field of Classification Search
CPC .................................................. G06Q 10/0635
USPC ............................................................ 719/328
See application file for complete search history.

(56) References Cited

U.S. PATENT DOCUMENTS

| | | | | |
|---|---|---|---|---|
| 2003/0236832 A1* | 12/2003 | McIntyre | ................ | H04L 29/06 709/204 |
| 2005/0010456 A1* | 1/2005 | Chang | .................. | G06Q 10/063 705/7.38 |
| 2013/0290690 A1* | 10/2013 | Nucci | ................ | G06F 17/30126 713/1 |

* cited by examiner

*Primary Examiner* — Timothy A Mudrick
(74) *Attorney, Agent, or Firm* — Courtney IP Law; Barbara B. Courtney

(57) ABSTRACT

A monitoring and information exchange network (MIEN) system and method are disclosed. The system and method include a network hardware and software platform through which multiple entities can more automatically conduct and manage their relationships and exchange data. Entities include but are not limited to corporate entities. Connections are established and maintained in the network on an individual-to-individual basis. Once connections are established the connection itself is automatically archived along with all communications history, and data exchange history. Documents and data that must regularly be exchanged can be automatically requested and generated.

21 Claims, 19 Drawing Sheets

| Screen Number | Screen Name |
|---|---|
| 1. Global - Bank Login 1.1.1 | 20. Global - Bank Login (login1.html) |
| 2. VM - Global Dash 2.1.1 | 21. Vendor - Global Dashboard (vn_global_dashboard.html) |
| 3. VM- Perf 3.1.1 | 22. Vendor - Performance Monitoring (vm_perf_monitoring.html) |
| 4. VM - Perf 3.1.2 | 23. Vendor - Performance Monitoring - CashEdge (vm_ce_sla_exceptions.html) |
| 5. VM - Perf 3.1.3 | 24. Vendor - SLA Detail (vm_system_availability.html) |
| 6. VM - Perf 3.1.3 | 25. Vendor - SLA Detail - Table (vm_system_availability_table.html) |
| 7. CM Quest Status - 24.1.1 | 26. Client - Active Questionnaires (cm_quest_status.html) |
| 8. CM Perf. Time Series 23.1.1 | 27. Client - Performance Monitoring (cm_perf_time_series.html) |
| 9. CM Perf. Time Series 23.1.2 | 28. Client - Performance Monitoring - Union Bank (cm_ub_sla_exceptions.html) |
| 10. CM Perf. Detail 23.1.3 | 29. Client - SLA Detail (cm_system_availability.html) |
| 11. CM Parf. Detail 23.1.3 | 30. Client - SLA Detail - Table (cm_system_availability_table.html) |
| 12. CM Edit SLA 23.2.3 | 31. Client - Edit SLA (cm_edit_sla.html) |
| 13. CM Configure Client 23.2.4 | 32. Client - Configure System Availability SLA (cm_configure_sla.html) |
| 14. CM WO ISO 28.1.1 | 33. Client - Workbench ISO (cm_workbench.html) |
| 15. VM Invitation 1.4.2 | 34. Vendor - Invite (vm_invite_vendor.html) |
| 16. VM Bulk Invite 1.4.4 | 35. Vendor - Bulk Invite (vm_invite_bulk.html) |
| 17. VM My Vendors 7.1.1 | 36. Vendor - My Vendors (vm_my_vendors.html) |
| 18. VM Client Dash 1.1.2 | 37. Vendor - Client Dashboard (vm_client_dashboard.html) |
| 19. Global - Registration - Cold Registration | 38. Global - registration - Cold Registration (Registration_cold.html) |

FIG. 14

39. Global - Registration - Inter Domain 1st Time
40. Global - Registration - inter Domain
41. Global - Registration - intra Domain
42. Forgot your password
43. Reset your password
44. Message View (x.messages.view)
45. Message Create (x.messages.create)
46. Message Reply (x.messages.reply)
47. Message Forward (x.messages.forward)
48. Message View Thread (x.message.view)
49. Invitation (x.invite.create)
50. invitation View Received (.invite.view)
51. Invitation View Sent (x.invite.view)
52. VM Settings Personal Profile (v.settings.profile)
53. VM Settings Personal Profile Edit (v.settings.profile.edit)
54. VM Settings Personal Profile Request Access (v.setting.profile.requestaccess)

66. Global - Registration - Inter Domain 1st Time (registration_inter_domain_f.html)
67. Global - Registration - inter Domain (registation_inter_domain.html)
68. Global - Registration - intra Domain (registation_intra_domain.html)
69. Forgot your password (reset_password.html)
70. Reset your password (reset_password_confirmation.html)
71. Messages - View (vm_messages.html)
72. Message - Create (vm_message_create.html)
73. Message - Reply (vm_message reply.html)
74. Message - Forward (vm_nmessage_forward.html)
75. Message - View Thread (vm_message_view.html)
76. Invitation - Create (vm_Invite_vendor.html)
77. Invitation - View Received (vm_invitations.html)
78. Invitation View Sent (vm_invitations.html)
79. VM Settings Personal Profile (vm_personal_profile.html)
80. VM Settings Personal Profile - Change Password (assets/popups_vm_change_password.html)
81. VM Settings Personal Profile - Request Access (assets/popups_vm_request_access.html)

55. VM SLA Time Series Zero State (v.pm.sla.timeseries)
56. VM Request SLA v.pm.sla.request)
57. (CM Add SLA (c.pm.sla.add)
58. CM SLA Added (c.pm.sla.add)
59. CM Upload SLA (c.pm.sla.upload)
60. CM Upload SLA 3 Options (cpm.sla.upload)
61. CM Review Upload SLA (c.pm.sla.upload.review)
62. CM Review Upload Add Attachment (c.pm.sla.upload. review)
63. CM Manage SLA (c.pm.sla.manage)
64. CM Manage SLA Details (c.pm.sla.manage.details)
65. CM SLA Activity (c.pm.sla.activity)

82. VM SLA Time Series Zero State (vm_perf_monitoring_zerostate.html)
83. VM Request SLA (vm_request_sla.html)
84. CM Add SLA (cm_add_sla.html)
85. CM SLA Added (cm_sla_added.html)
86. CM Upload SLA (cm_sla_upload.html)
87. CM Upload SLA 3 Options (cm_sla_upload.html)
88. CM Review Upload SLA (cm_sla_upload.review.html)
89. CM Review Upload - Add Attachment (assets/popups/cm_add_attachment.html)
90. CM Manage SLA (cm_manage_sla.html)
91. CM Manage SLA Details (cm_manage_sla_detail.html)
92. CM SLA Activity (cm_sla_activity.html)

FIG. 15B

93. CM Edit SLA (c.pm.sla.edit)
94. CM Task Workbench (c.task)
95. CM Add New SL (c.pm.sla.add)
96. CM Review Upload SLA File Added (c.pm.sla.upload.review)

97. CM Edit SLA (cm_edit_sla.html)
98. CM Task Workbench (cm_tasks_panel.html)
99. CM Add New SLA (cm_add_sla_new.html)
100. CM review Upload SLA File Added (cm_sla_upload_review.html)

FIG. 16

BUSINESS-TO-BUSINESS (B2B) MONITORING AND INFORMATION EXCHANGE NETWORK SYSTEM

RELATED APPLICATIONS

This application claims priority from U.S. Provisional Patent Application No. 62/272,763, filed Dec. 20, 2015.

BACKGROUND

The last decade has seen the rise of consumer networks of all sorts: social networks like Facebook™, professional networks like LinkedIn™, financial networks like Lending Club™ and several others. A common element of these networks is that individuals can connect with other individuals and exchange information. These network platforms were revolutionary because they allowed for one-to-many and many-to-many communication in ways that had never been possible before.

Unlike the consumer world, the business world has not seen widespread use of one-to-may or many-to-many networks for information exchange. There have been old networks like purchasing networks but nothing of the type and scale that we have seen in the consumer world. There are several reasons for this, including the unsolved technical challenges of securely accessing confidential data of many organizations, securely maintaining network relationship information and historical interaction data, among others.

FIG. 1 is a diagram illustrating a typical current process by which vendors and clients interact. All communications are one-to-one meaning one person at an entity interacts with another person at another entity. Any information gathering or data exchange is conducted manually, which requires a lot of effort for the individuals on either side of the communication.

In this example of clients and vendors, clients face growing regulatory pressure regarding management of third and fourth party relationships. That is any individual one-to-one communication may require one of the communicants to take some compliance action manually. This invites errors and increases inefficiency. In addition, it is currently difficult to aggregate data across multiple vendors, multiple organizations, and multiple processes given that there are no data standards across items and vendors.

On the vendor side, the vendor deals with many client requests for data, often being requests for reporting or compliance-related data. Vendors currently must deal with this overhead without internal systems to assist with automatically foreseeing and managing these aspects of client management.

Businesses have multiple relationships with other businesses. The most common type of relationship is that of a vendor and a client. A company can have multiple vendors and multiple clients. In addition, a company can have other types of B2B relationships such as with distributors, franchisees, marketing partners or survey respondents. In each of these relationships, there are specific products or services involved—one party delivers a certain service or product to the other party. Most of these relationships are governed by legal contracts and are subject to specific performance requirements. These requirements require a lot of information to be exchanged between the two parties. Let us take the vendor-client relationship as an example. In such a relationship, the client has to monitor the performance of the vendor. This is essential to ensure that the client has a secure and reliable partner. Such oversight of the vendor relationship is especially important when confidential data is being shared. With the rising threat of cyber-attacks, often the most vulnerable point may not be the internal systems of a company but a system of one of the company's vendors. Additionally, there are regulatory reasons for such monitoring. For example in the financial services industry, there are stringent requirements by regulators to ensure that financial service firms are monitoring their data supply chain—or their $3^{rd}$ and $4^{th}$ parties as they are often called in the trade. In addition to the regulatory reasons, there may be reputational reasons as well for such monitoring, as in the case of the retail industry where a retailer or manufacturer wants to make sure that its overseas supplier is using good human resource practices in compliance with US laws for example.

In the context of these relationships, there is a lot of data and information that is exchanged routinely. For example, for monitoring performance, companies send reports to their clients. These performance requirements are referred to by many names such as Service Level Agreements (SLAs) or Key Performance Indicators (KPIs) or Key Relationships Indicators. In addition, the parties also agree to specific oversight requirements—whether these are done through questionnaires being sent by one party to the other or other types of assessments such as on-site audits or third party audits. Additionally, there are many other types of information exchanged between the parties—these can be incident reports, financials, announcements or remediation items.

A B2B relationship is operationalized typically through individual employees at each company that interact with their counterpart at the other company. For example, Joe at company A deals with Sarah at company B and will interact with her to request information, provide reports and send messages. An example is a vendor manager at a company who may be dealing with a client manager at the other company. The vendor manager receives monthly SLA reports, periodic documents, receives questionnaires, answers the questionnaires which are then evaluated by the client and the evaluation may result in additional requests or actions.

Another important feature of these B2B relationships is their chain of dependency. For example, Company A may be a client of Company B and monitors its performance for the specific product or service that they have purchased from B. However, since the goal of the monitoring is to be informed about the reliability of the vendor, it is well known that the status of the vendor is in turn dependent on the reliability of its vendors or vendors of vendors.

It would be desirable for businesses to be able to use a network system for Business-to-Business (B2B) information exchange and monitoring.

BRIEF DESCRIPTION OF THE DRAWINGS

FIGS. 14-16 list and describe screens of a user interface through which MIEN network participants interact with each other using the platform.

DETAILED DESCRIPTION

Disclosed herein is a B2B monitoring and information exchange network (MIEN) system that addresses the inefficiency of current many-to-many communication between businesses by creating a shared platform that enables both parties to interact efficiently and securely. It allows for two parties to provide information securely to multiple parties and/or for the counter party to efficiently aggregate similar information from multiple parties to assess risk. As described further herein, the system comprises processors and data storage facilities that automate aspects of data exchange and message interaction between individuals in different corporate entities that have specifically defined relationships. This includes the execution of instructions by the MIEN system that causes processors and database facilities to execute functions or take on altered configurations automatically.

In embodiments, relationship-pair modules allow individual user connections to build company-level relationships. The system is designed around relationship pairs. For example, for a vendor-client relationship, the system implements a vendor module and a client module. These pairs can only speak to each other (although in other embodiments, one module may be able to speak to a defined set of other modules too). That means if a user within a company is using a client module and sends a message or an invitation to another individual at another company, the client module interacts with a vendor module at the other company to respond to that communication. The counterparty at the other company can only do so within the vendor management module.

Figure 1:
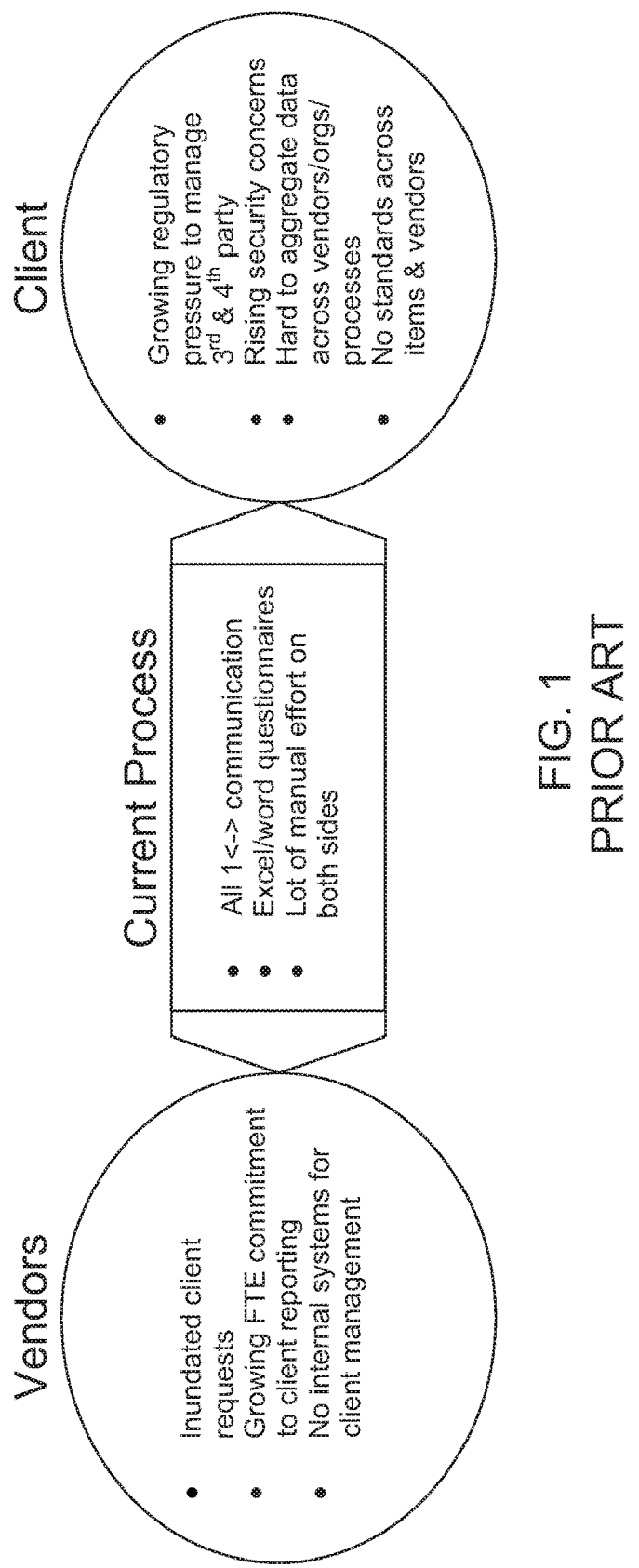
FIG. 1 is a diagram of a prior art vendor-client interaction.
Figure 2:
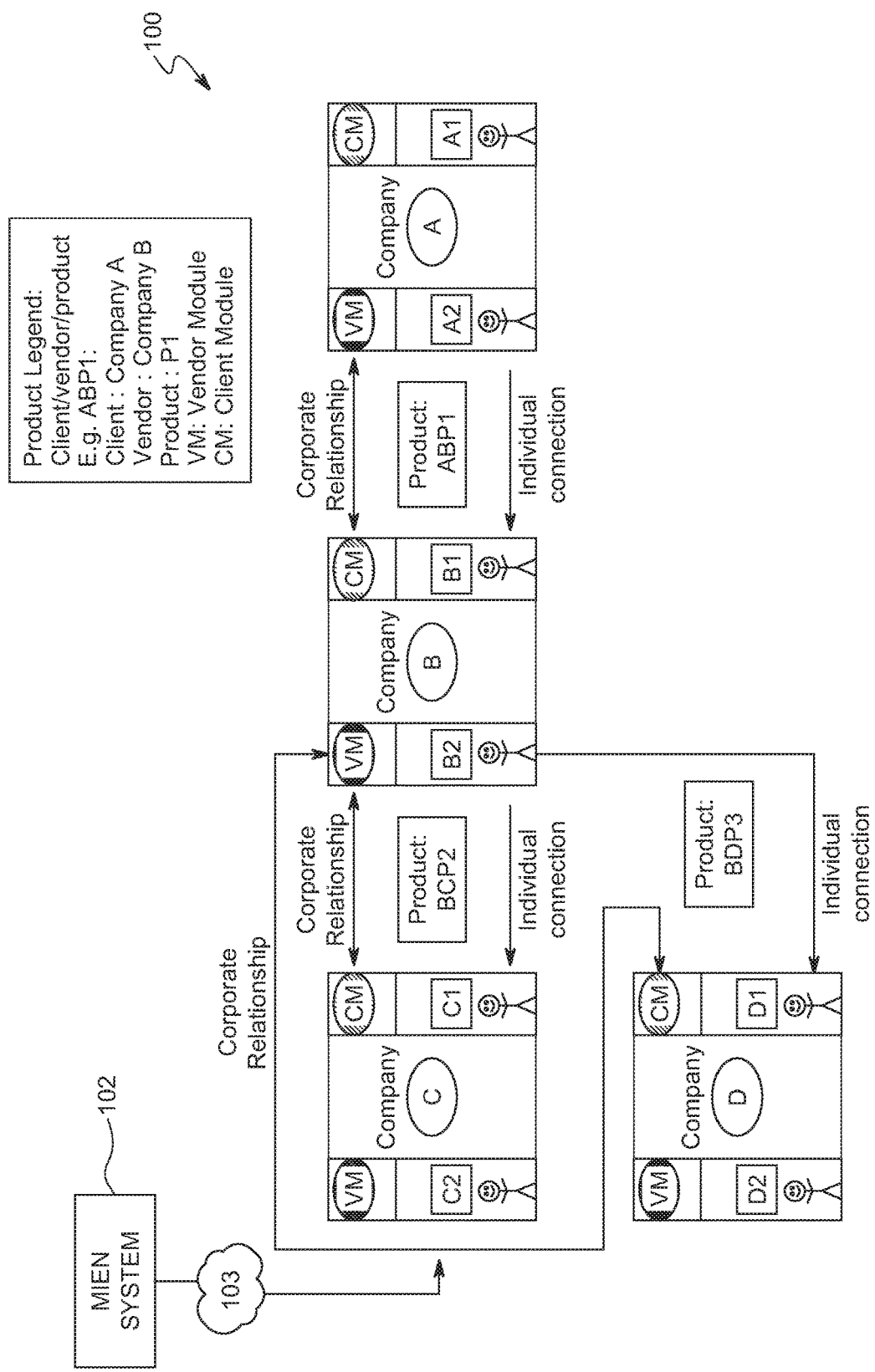
FIG. 2 is a diagram of a monitoring and information exchange network (MIEN) system according to an embodiment.

FIG. 2 is a block diagram of an overall system architecture 100 including a monitoring and information exchange network (MIEN) system 102 according to an embodiment. MIEN system 102 communicates with multiple entities (typically corporate entities) via the internet 103. As further described below, the MIEN system 102 provides a network hardware and software platform through which the multiple entities can more automatically conduct and manage their relationships and exchange data. In an example scenario, if A is using a product from B and wants to monitor B's performance, A also needs to be informed about the performance of C who is a vendor to B. And this chain can theoretically extend to several links. Often these chains are referred to as $3^{rd}$ party (for an immediate vendor) or $4^{th}$ party (for a vendor's vendor) and so on. This chain can also be seen in reverse: if a client is party 0, the client of the client is party 1 and so on. This "upstream" chain would be relevant for example in the context of a relationship with a distributor who sells a product to multiple customers. From an industry perspective, these upstream and downstream links can be seen as a continuous chain that is of interest to regulators to understand systemic risks and vulnerabilities in an industry.

For example, say a user A2 at Company A uses the Vendor Management (VM) module to interact with user B1 at company B1. The system automatically assumes that user B1 at Company B will be in the Client Management (CM) module. And that paired relationship is repeated down the chain to Company C and Company D. At each stage, each of the companies may be dealing with multiple companies in the counter-party role.

Figure 3:
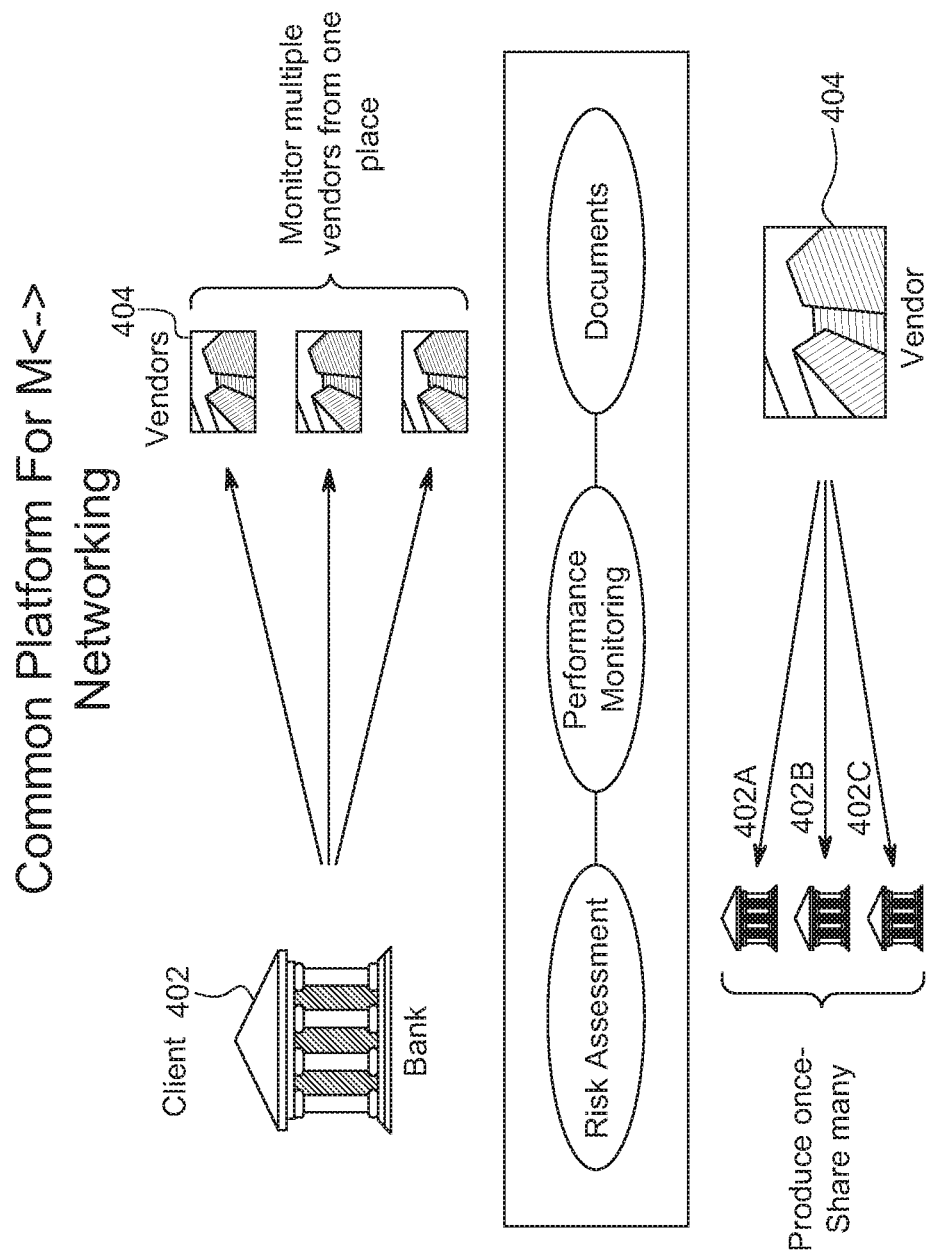
FIG. 3 is a diagram demonstrating that the MIEN system/network is a many-to-many network that allows multiple vendors and multiple clients to manage many tasks through one unified platform

FIG. 3 demonstrates that the MIEN system/network 102 is a many-to-many network that allows multiple vendors and multiple clients to manage many tasks through one unified platform. In the example used, a bank is shown as a client, but embodiments are not so limited. Any businesses managing multiple relationships with vendors/customers/clients benefit from using the platform. Client bank 402 uses the MIEN system/network 102 to communicate with and monitor multiple vendors 404 from one location. Monitoring includes risk assessment, performance monitoring, and document collection, storage, and exchange.

Documents produced by a vendor 404 can be produced once and shared with multiple clients of client locations 404 as appropriate, which obviates the necessity for individuals in each of client 404A, 404B and 404C to engage in an entire chain of communication with vendor 404 in order to obtain the documents.

Figure 4:
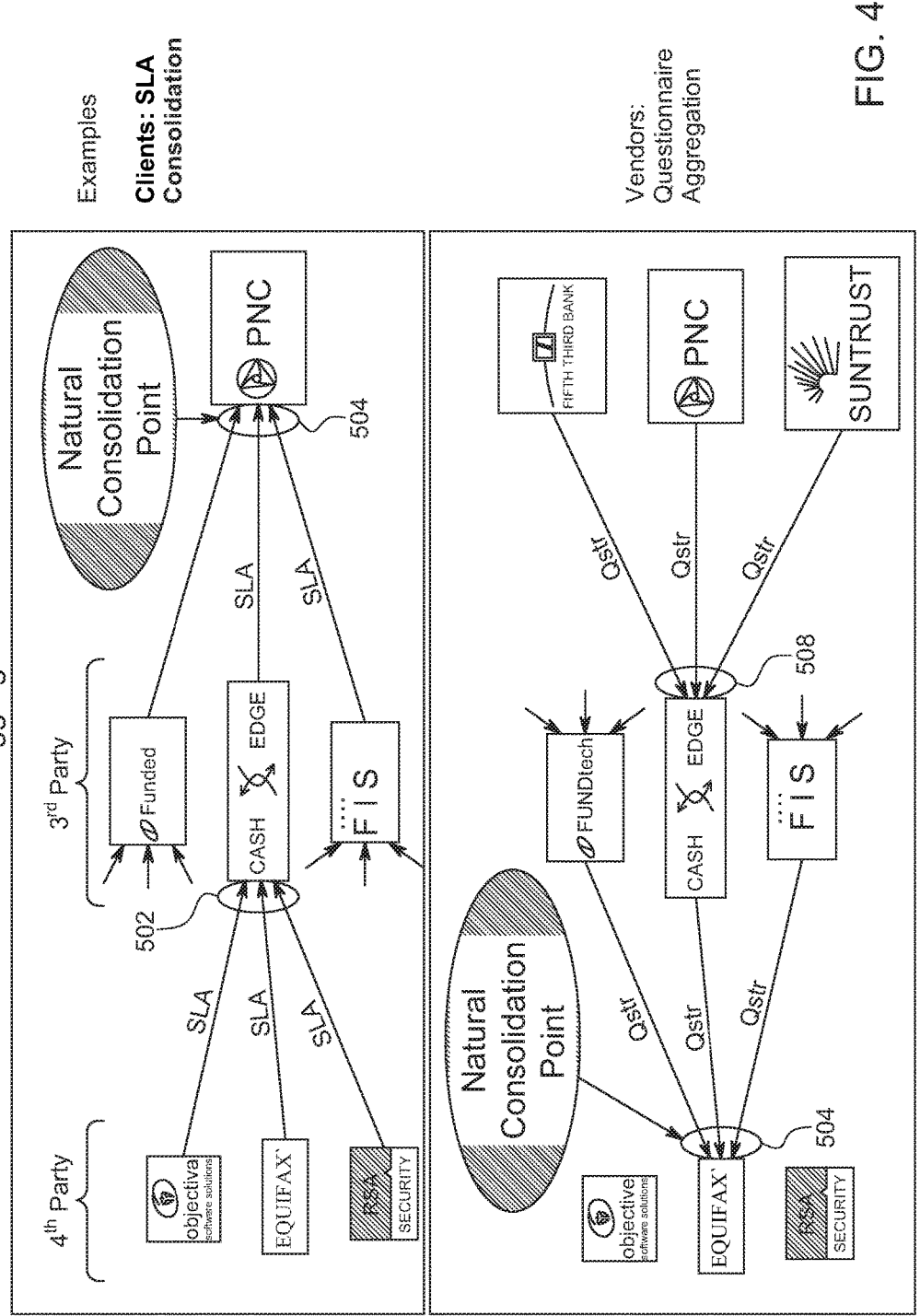
FIG. 4 is a diagram illustrating natural points of aggregation according to an embodiment.

FIG. 4 illustrates natural points of aggregation for one example situation, in this case service level agreement (SLA) consolidation and questionnaire consolidation. Again, this is just one specific example, and many other types of businesses and information requirements are included. In this example, SLAs and questionnaires are documents that must currently be requested and generated each time one is needed. As shown at 502, if multiple companies must submit service level agreement to one other company (in this case a third party company) and several third party companies must submit SLAs to a single company as shown at 504, point 504 is a point at which the process is consolidated by the MIEN system/network 102.

Similarly, if several companies must submit questionnaires to a the third party company from the previous illustration (at 508), and the third party company is one of several third party companies that submit questionnaires to one of the fourth party companies, a consolidation point is at the fourth party receiving company.

Figure 5:
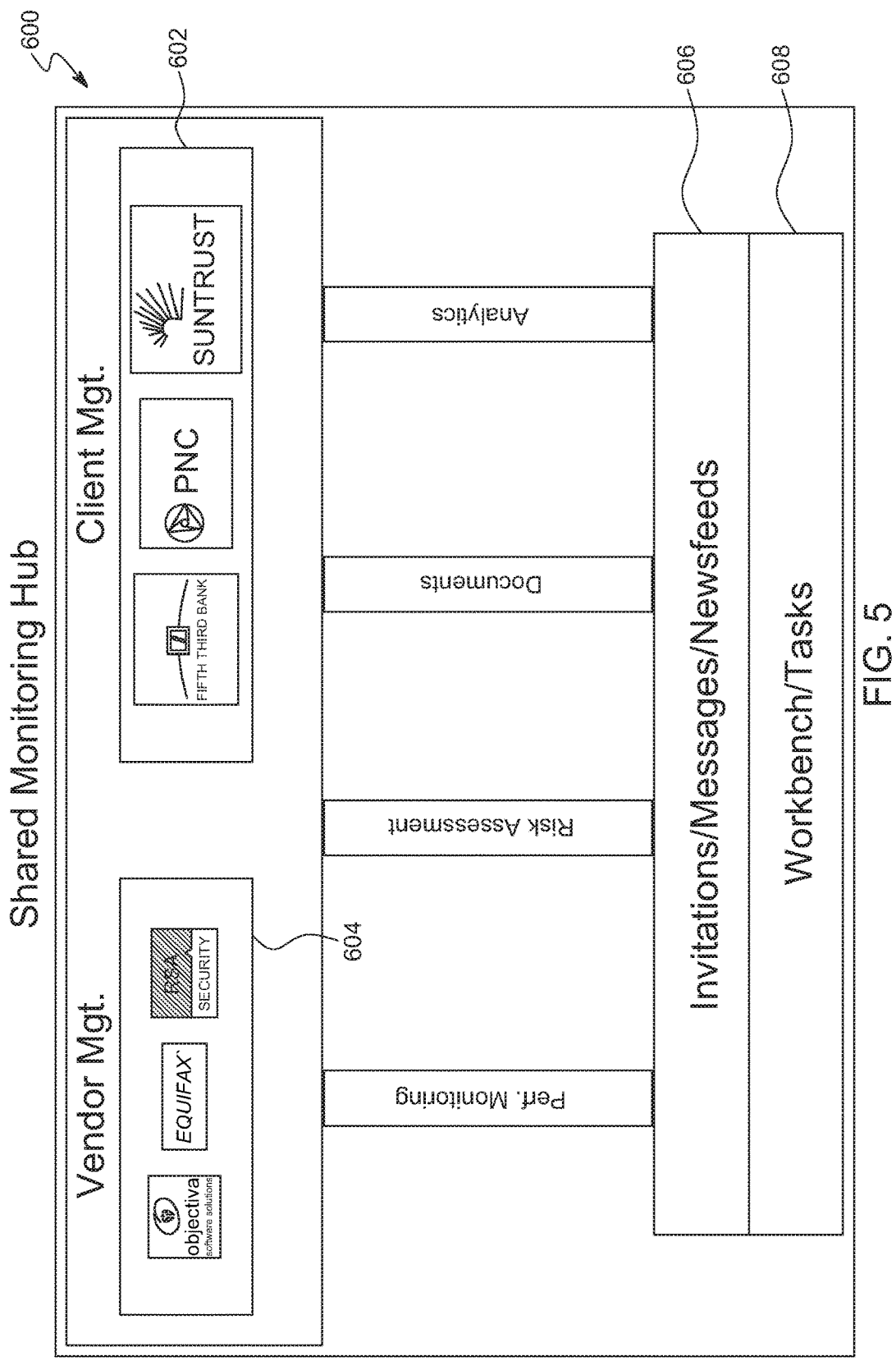
FIG. 5 alternatively illustrates the MIEN system/network platform as a shared monitoring hub.

FIG. 5 alternatively illustrates the MIEN system/network 102 platform as a shared monitoring hub 600 through which both vendors (through a vendor management module 604) and clients vendors (through a client management module 602) can automatically keep current with tasks such as performance monitoring, risk assessment, document archival/exchange, and analytics. A common platform for many-to-many communication is provided. Participants can manage upstream and downstream messages and data through the use of vendor management modules and client management modules. The scope of invitation/messages/newsfeed and data management is comprehensive (including for example, performance monitoring, risk assessment, document archival/exchange, analytics, and $4^{th}$ party monitoring). Flexible reporting is enabled (e.g., by organization, vendor and/or product). A task workbench 608 facilitates workflow on both vendor and client sides. Invitations (to the MIEN network/platform), messages, and newsfeeds 606 are also enabled. In various embodiments, the MIEN network uses data to pre-seed a vendor/product directory that is particularly meaningful to participants.

Figure 6:
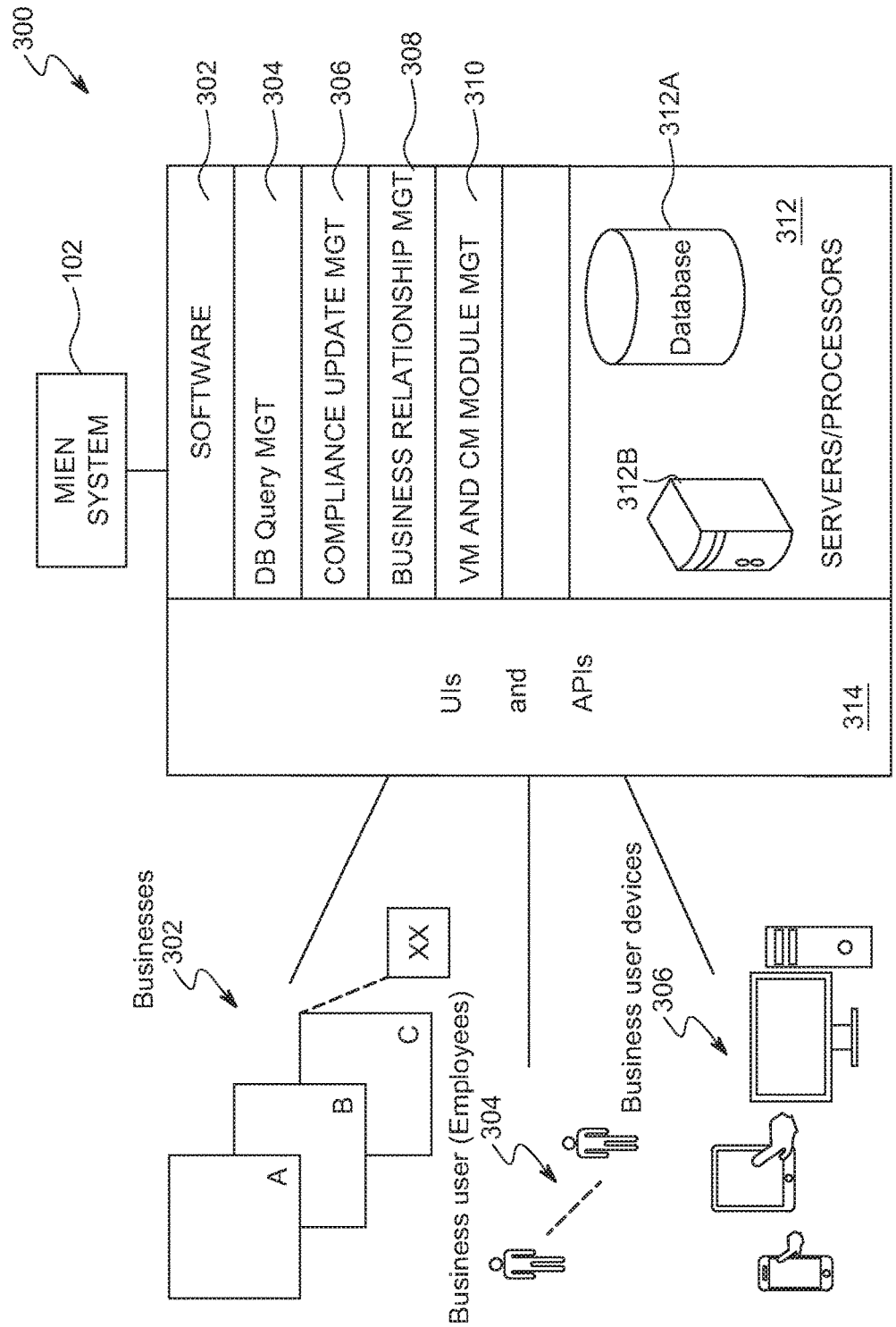
FIG. 6 is a diagram of a monitoring and information exchange network (MIEN) system according to an embodiment.

FIG. 6 is a block diagram of another view of an overall system architecture 300 according to an embodiment. The interaction of businesses with the MIEN system 102 is through business users (typically employees) logging onto a MIEN web site. Business users can access the MIEN system using any Internet capable user devices 306, such as personal computers, laptops, tablet computers, and smart phones. The MIEN system includes user interfaces and application programming interfaces 314 through which business users and possibly third parties can access the capabilities of the MIEN system and, in some embodiments, query the MIEN system databases.

The MIEN system runs multiple servers (which encompass processors 312B) and maintains multiple databases 312A. Although the servers and databases are shown in a discrete location, they may be in fact distributed geographically in any manner. In addition, processing tasks may be shared among many processors whether or not they are collocated. MIEN software processes are executed by the processors and perform a MIEN method as further described below. Non-exclusive examples of software processes include:

vendor management (VM) module and client management (CM) module management 310;
business relationship management 308, which serves to maintain a record of relationships between businesses;
compliance update management 306 which serves to update any rules and laws that must be complied with by businesses;
database query management 304 which serves to facilitate sophisticated searches of the MIEN databases 312A; and
Servers/processors 312 respectively execute the processes described herein and store data securely for multiple businesses 302.

In various embodiments, MIEN databases 312A include a questionnaire database to assist business users in creating questionnaires that are routinely sent to counterparts. Business user can create questionnaires to submit through the MIEN system. However, the questionnaire database is more efficient in that is it tailored to a particular business. In addition to the questions in the database being categorized by business type, they are also grouped by frequency of use. For example, a particular question is known to be asked 100% of the time of vendor of financial institutions. Or another question is asked 10% of the time for vendors who deliver food to homes.

Another dedicated MIEN database 312A is a Service Level Agreement database.

Yet another dedicated MIEN database 312A is a business directory database that is populated by a company to include all information items of interest to current or potential business relationships. These items include product lists, service lists, and so on. This database can be automatically populated continually with the latest information, and is more current than the company web site, which is updated at longer intervals.

Once businesses 302 begin conducting all of their 1-1 relationships using the MIEN system 102, business users 304 no longer need to email their counterparts, exchange data files using email or Dropbox™-like sites, or spend time on the phone or other business user devices 306 for these purposes.

As a result of this paired communication, MIEN system 102 is able to automatically deduce company relationships based on the connection between two individuals (business users 304). So (with reference to FIG. 2) when user A2 sends an invitation from within the VM module to user B1 at company B, and B1 accepts the invitation, the system is able to deduce Company B has a vendor relationship with Company A and that A2 is a client and B2 is a vendor. This automatic categorization of the company relationship provides an efficient way to create a scalable network system for B2B relationships. This becomes even more apparent when one takes into account that company A and B might have multiple relationships that all operate at the same time. It is conceivable that B is a client of Company A for one product while being a vendor to Company A for a different product. And in fact it could be the same pair of users interacting with each other but in reversed roles. The system is able to keep these company relationships and user connections separately organized by tagging each message or data set that is exchanged between the two entities and the two users by virtue of the relationship pairing of the modules.

The linked chain of bilateral relationships can also be used to construct the multi-link chain at the product and company level. In the design of the system, the linked product chain or dependency chain can be created by using the paired-module approach. For each bilateral relationship, there is a product involved. For example, between Companies A and B, there is a product involved called ABP1 (meaning A is the client, B the vendor and the product is called P1). Company B has a vendor relationship with Company C and the product is P2 (Hence BCP2) or similarly BDP3 represents product P3 between client B and Vendor D. If a company in this chain were to link one product with another product in this bilateral relationship, the system is able to construct a multi-link chain of dependency for a given product. Such a chain could not previously be easily constructed because there is no physical way to link these relationships since the scope of each relationship is bilateral governed by legal contracts—hence the reporting obligations exist only bilaterally. In the disclosed system, if Company A were to link its product with B's product and B were to do the same with Company C or D, the system constructs a dependency or linkage chain where ABP1 depends on BCP2 and BDP2. Knowledge of this dependency chain can be very important to every player (especially multi-link chains) for all kinds of reasons such as information security. For example, if a Bank A were to use a vendor B and pass on some personal information about their customers (e.g. SSN or Driver's License) to vendor B to perform a service and then Vendor B were to pass that on to Vendor C and Vendor D to perform a service in support of their service to B, then that dependency chain is very important for Bank A to know and monitor. An incident or security breach at Company C or D may not be immediately within the purview of A (because they have no contract with C or D) but its impact on them could be significant. Such chains would also be very important for regulatory agencies that are interested in understanding the systemic risks and dependencies in an industry especially in light of the emerging information security risks.

Figure 7:
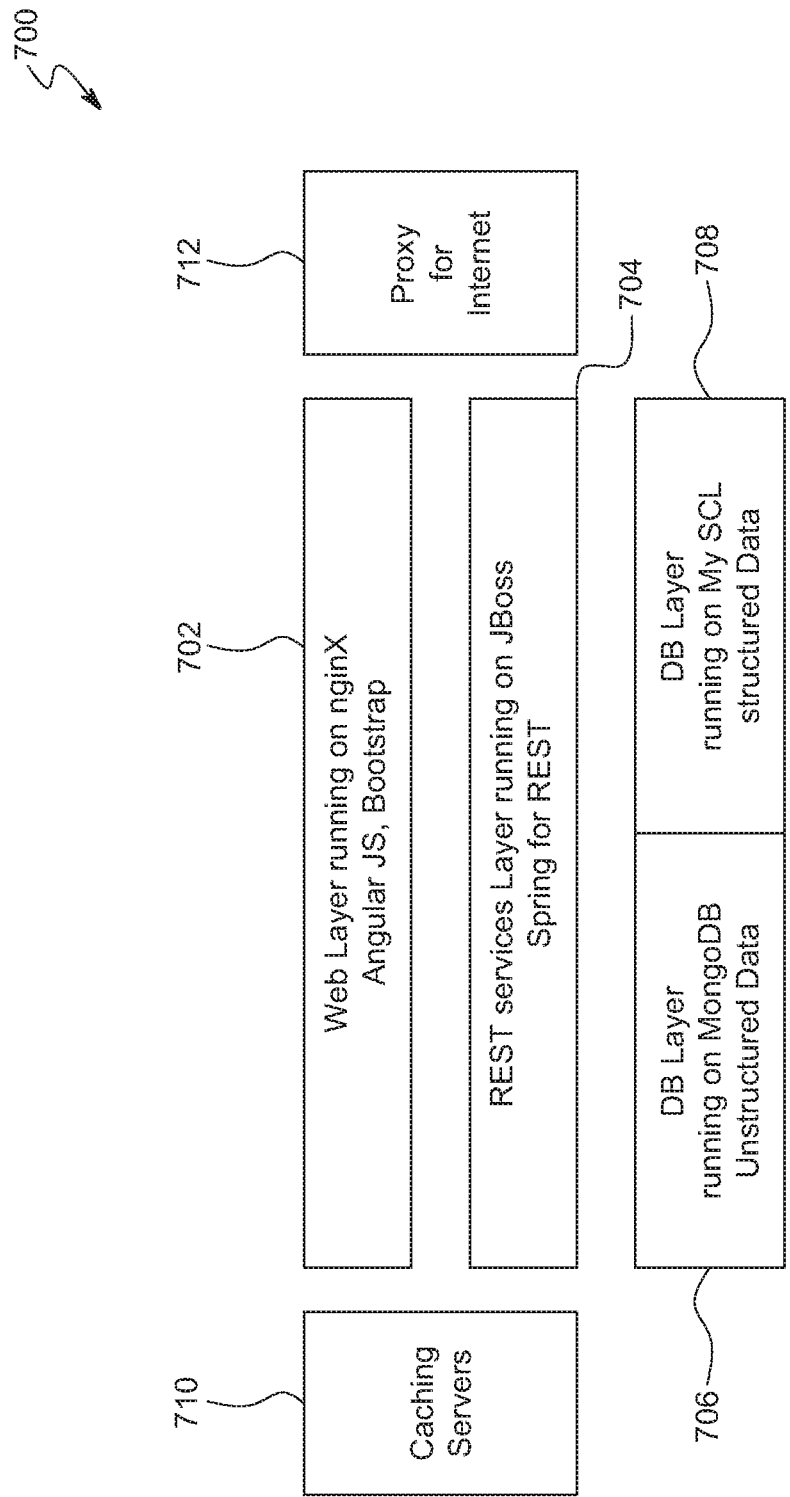
FIG. 7 is a block diagram of a MIEN system architecture according to an embodiment.

FIG. 7 is a block diagram of a MIEN system architecture 700 according to an embodiment. Between caching servers 710 and Internet proxy servers 712 sit layers of software processes. Caching server 710 may be physically located anywhere. Proxy servers 712 may also be located anywhere, and provide the communication interface between the internet and the MIEN system as well as preserving privacy of information. Database (DB) layers 706 and 708 are examples of types of databases that can be employed to store and make accessible user data and company data as further disclosed herein. In this example, DB layer 706 stores unstructured data and DB 708 stores structured data. The MIEN system is designed to accept and make available many types of data.

A web services layer 704 is a REST layer in one embodiment. A web layer 702 in one embodiment runs on nginX, but other configurations are within the scope of the invention.

Figure 8:
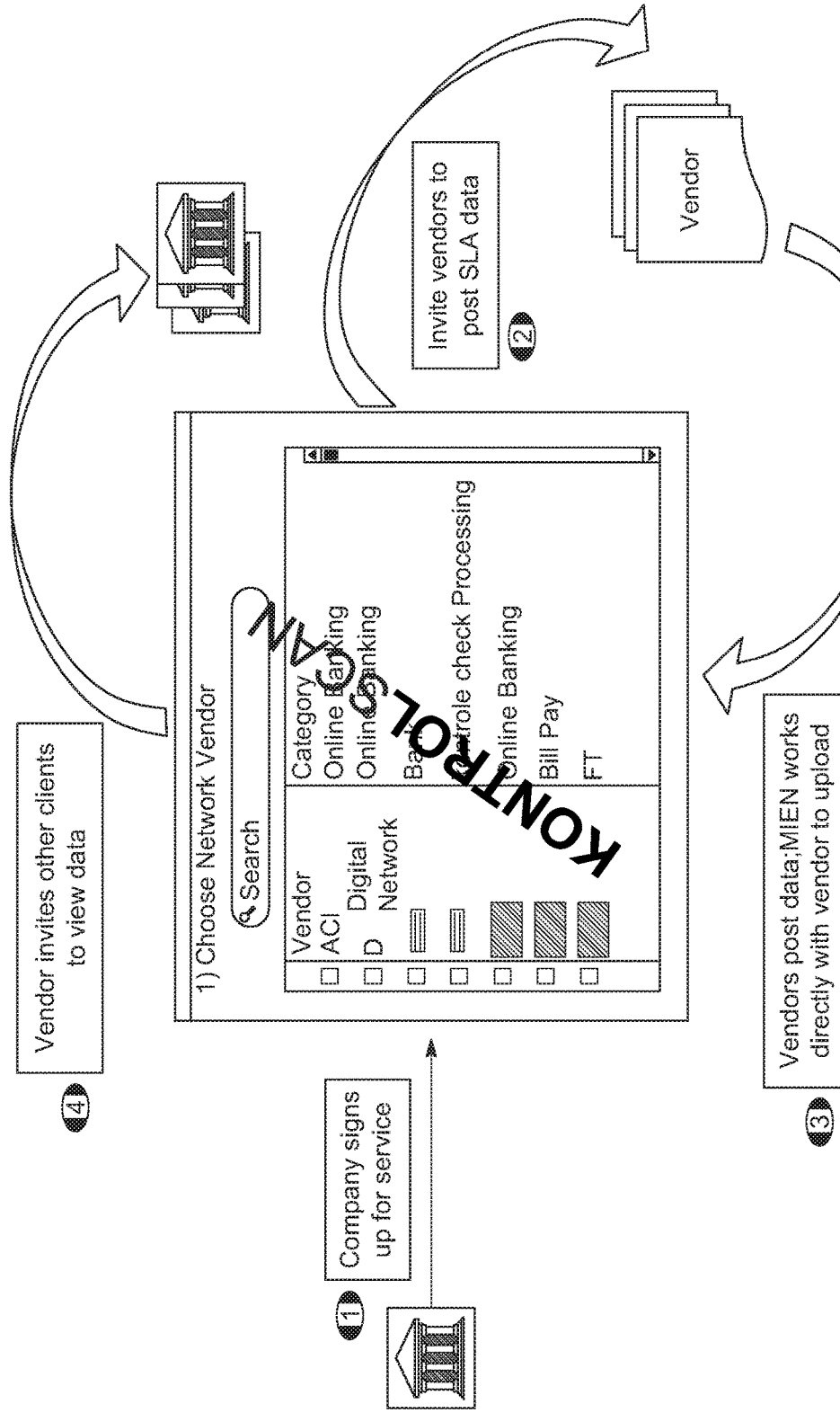
FIG. 8 is an illustration of one method of getting started using the MIEN system/network.

FIG. 8 is an illustration of one method of getting started using the MIEN system/network 102. At 1, a new user company uses the MIEN user interface to sign up for the service, which means signing up to use the MIEN system/network 102 to create and participate in an intercompany network. In an embodiment, the user interface displays a pre-populated list of companies from which the new user company can choose vendors. Through the MIEN system/network 102, chosen vendors are invited to post SLA data (and other data) using the MIEN system/network 102 (shown at 2). When a vendor posts data, the MIEN system/network 102 works directly with the vendor to upload the data to the MIEN system/network 102 (3). Once the data is uploaded, the vendor can invite other clients (other than the new user company) to view data using the MIEN system/network 102 (4).

Figure 9:
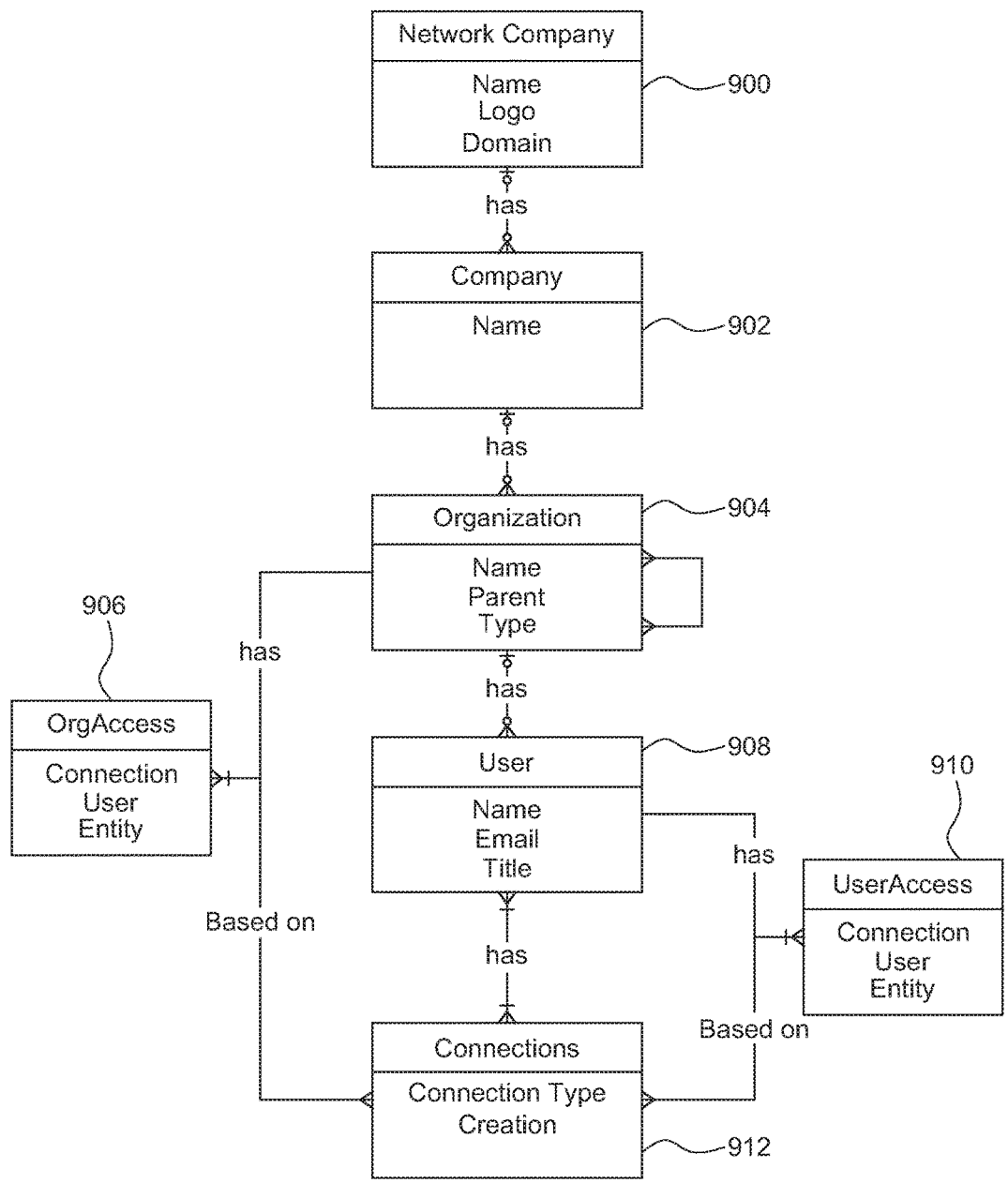
FIG. 9 is a block diagram illustrating relationships between a company's systems and various users according to an embodiment of a MIEN network.

FIG. 9 is a block diagram illustrating relationships between a company's systems and various users according to an embodiment of a MIEN network.

Network company 900 in this example is a company using the MIEN network system. Company 900 is defined at least in part, by a name, a logo and a domain. The network company in turn as a company 902 that may represent a company entity organized beneath the network company 900. The company 902 is recognized within the system by a name, and has an organization entity 904 defined at least in part by an organization name, a parent identification, and an organization type. Within the organization 904, there are multiple users 908, identified by a user name, a user email address and a user title. The organization user 908 has connections 912 identified by connection type and creation method. Organization access 906 represents the access that organization 904 gains to common MIEN communications and data based on connections 912. In turn, on the side of entities accessing the MIEN network of the organization 904, user access 910 represents external users who have a connection to the network based on connection (912) type and creation method.

Figure 10:
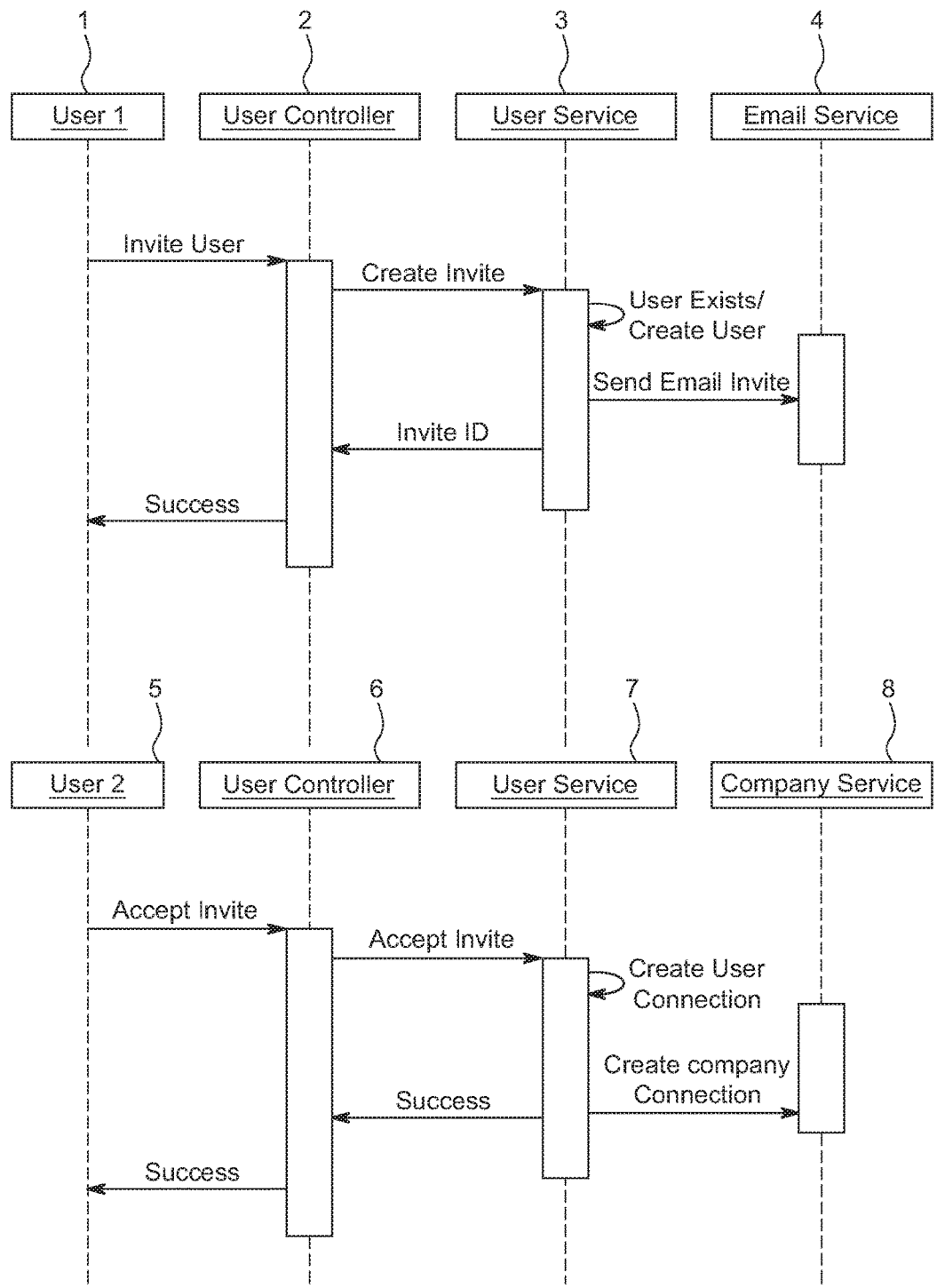
FIG. 10 is a flow diagram illustrating the creation of user connections by a MIEN system according to an embodiment.

FIG. 10 is a flow diagram illustrating the creation of user connections by a MIEN system according to an embodiment. Referring to the circled numbers that reference columns of the diagram, in column 1, a user 1 (who is currently part of a company or organization that uses the MIEN system) invites a user. This causes a user controller (2) to create an invitation that is handled by a user service (3) of the MIEN system. The user service determines whether the user exists, and is the user does not exist, and email invitation is sent to the user by email service (4). An invite ID is returned to the user controller. When the invitation is successful, the MIEN system is in communication with user 2 (5). When user 2 accepts the invite, the user controller (at 6) transmits the acceptance to the user service (at 7). The user service creates a user connection and sends a success message to the user controller (which conveys it to user 2). The user service also creates the company connection and sends details regarding the company connection to company service (8).

Figure 11:
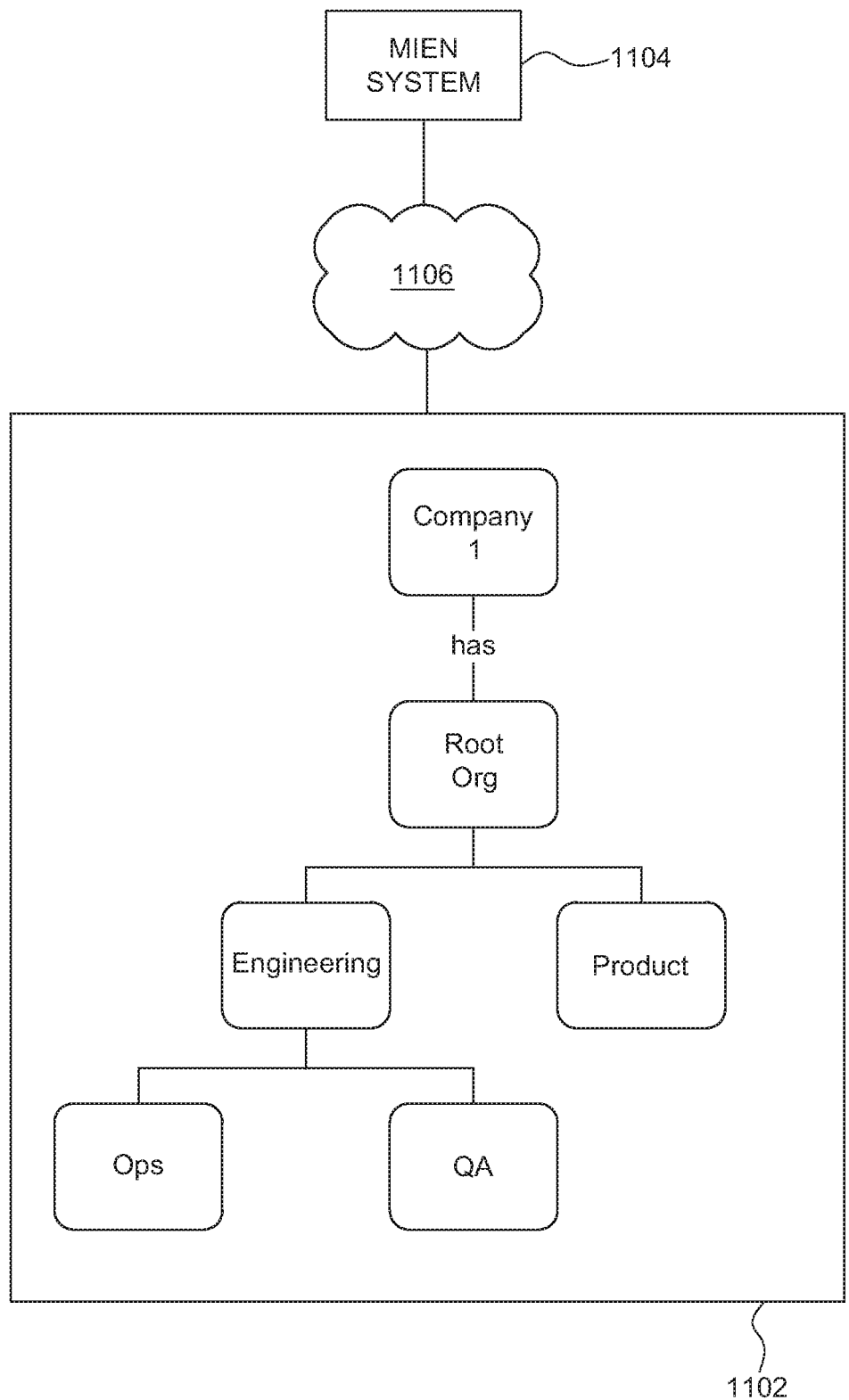
FIG. 11 is a block diagram of an example company system illustrating a MIEN systems access to the system according to an embodiment.

FIG. 11 is a block diagram of an example company system illustrating a MIEN systems access to the system according to an embodiment. Company "1" 1102 includes various groups defined by function or output or any other criteria. Each group includes its own processes and databases. In this example, company "1" includes a root organization group, an engineering group, a product group, an operations group, and a quality assurance group. MIEN system 1104 has access to all of these groups within company "1 in order to produce content for sending to external users or to receive content sent by external users.

Figure 12:
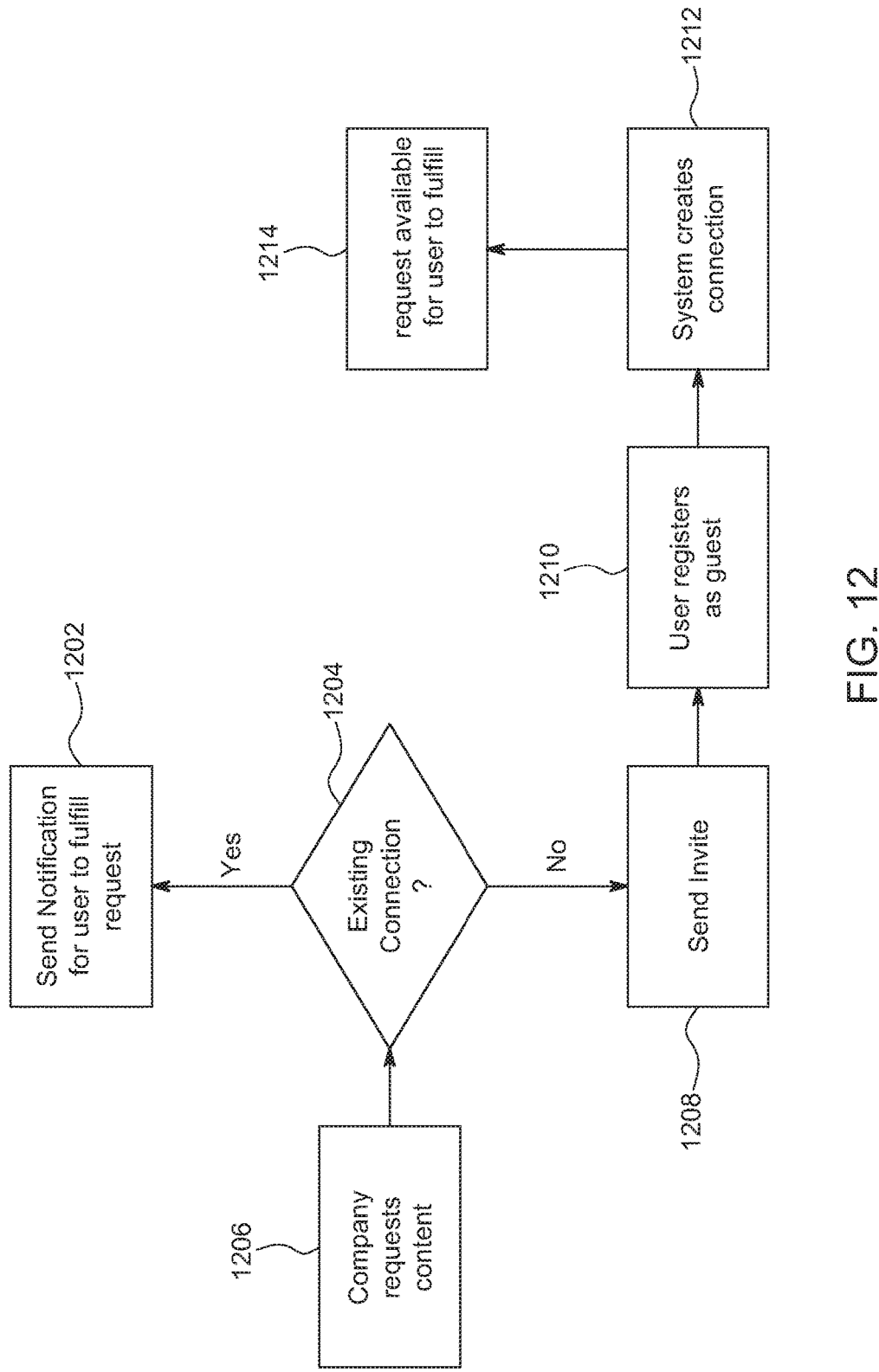
FIG. 12 is a flow diagram of a request-for-content process according to an embodiment.

FIG. 12 is a flow diagram of a request-for-content process according to an embodiment. Content may be any kind of data exchanged by companies that participate in the MIEN system. At 1206, a company requests content from another company or entity with which it has some kind of relationship. At 1204, it is determined whether there is an existing connection within the MIEN network. If there is an existing connection, at 1202 the MIEN system sends a notification for a user to fulfill the request. If there is not an existing connection, the MIEN system automatically sends an invitation (1208) to the company/user from whom the content is requested. The user may register as a guest of the MIEN system (1210), causing the MIEN system to create a connection (1212). The request is then available to the guest user to review and fulfill (1214).

Figure 13:
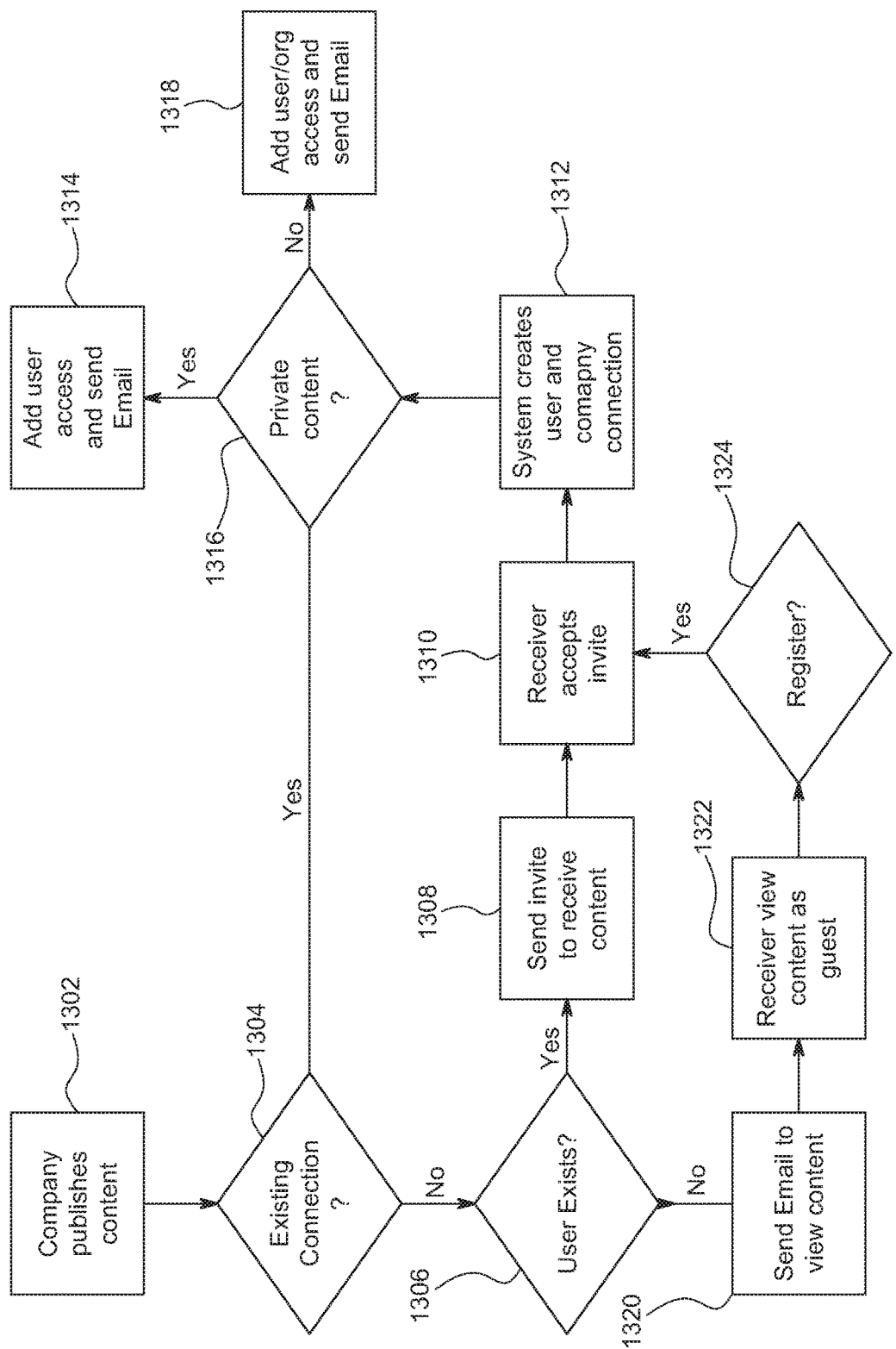
FIG. 13 is a flow diagram of a content publication process according to an embodiment.

FIG. 13 is a flow diagram of a content publication process according to an embodiment. At 1302 a company (which is part of the MIEN system) publishes content.

Content can be any data of interest to other companies or entities with which the company has a relationship. At 1304 it is determined whether there is an existing connection between the publishing company and the intended recipient company. If there is an existing connection, it is determined whether the content is private (1316). If the content is private, the MIEN system automatically adds user access credentials and sends an email with these credentials to the intended user. As previously described, connections for data exchange within the MIEN system are most typically on a one-to-one basis, meaning the system knows the individual to whom the email should be addressed based on connection data already stored by the system.

If the content is not private, the user/org access is added to an email (1318) which can go to the recipient organization as a predefined group of individual recipients.

Referring again to 1304, if the connection does not exist, it is determined whether the user exists within the MIEN system (1306). If the user exists, an invitation is sent to the user to receive the content (1308). When the user accepts the invitation (1310), the system creates (1312) a user and company connection, and the process continues to 1316.

Referring again to 1306, if the user does not exist, the system generates and sends an email to the user with an invitation to view the content (1320). The receiver can then view the content as a guest of the MIEN system (1322). The receiver is invited to register with the MIEN system (1324). If the receiver accepts the invitation (1310), the user becomes an existing connection, and data in the form of notifications and contents is automatically addressed to the receiver. In addition, the receiver then is connected in the MIEN system with the sender of the content.

FIGS. 14-16 list and describe screens of the user interface through which MIEN network participants interact with each other using the platform. The user interface is executed by servers 312B and is accessed by business users 304. A shown in the descriptions, various screens are presented through a vendor module, while others are presented through a client module. In this single example, a particular group of relationships is accommodated, but any kind of industry relationships could also use the platform.

Figure 17:
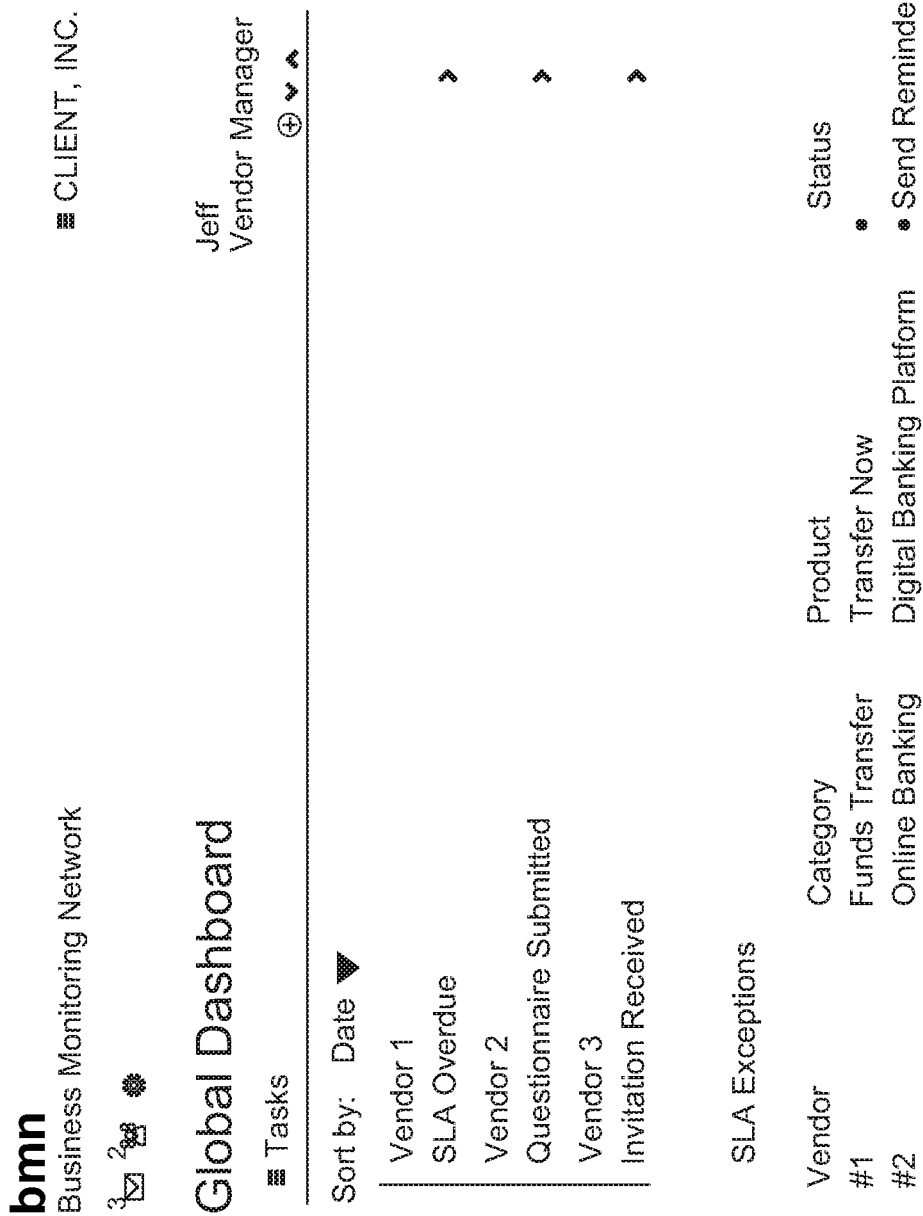
FIG. 17 is a screen shot of screen number 2 of FIG. 14.

FIG. 17 is a screen shot of screen number 2 of FIG. 8. This is a global dashboard visible to Jeff, who is a vendor manager at the company "Client, Inc." Jeff can see pending tasks for multiple vendors, as well as more detailed information. In this case the more detailed information includes SLA exceptions, but embodiments are not so limited.

Figure 18:
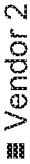
FIG. 18 is a screen shot of screen number 26 of FIG. 14.

FIG. 18 is a screen shot of screen number 26 of FIG. 8. This is an "active questionnaires" page visible to Janette, who is an info security officer at Vendor 2. Jeff and Janette are connected individually through the MIEN network. Janette can also see pending tasks from her side, which include active questionnaires from multiple clients.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A monitoring and information exchange network system (MIEN), comprising:
   at least one searchable database system;
   at least one processor coupled to the at least one searchable database system, the at least one processor executing instructions for a MIEN system method, the method comprising,
      executing a plurality of user interface processes for enabling users to interact with the system;
      executing a plurality of application programs interfaces (APIs) enabling multiple systems external to the system to interact with the system, including exchanging data and querying the at least one searchable database;

initiating connections between users of the system, wherein users of the system comprise individuals acting on behalf of corporate entities; and automatically managing relationships between users of the system, including storing communication history, automatically generating and exchanging data and data queries that are repeatedly required, and causing changes in databases and processor configurations of the at least one searchable database, the at least one processor, and databases and processors external to the system; and wherein automatically managing relationships further includes managing a history of individuals at the different corporate entities, maintaining a history of the relationships and a history of data inquiries; wherein the history of individuals comprises names of individuals, contact information of individuals, and a record of communications between pairs of individuals that interact one behalf of different corporate entities.

2. The system of claim 1, further comprising:
a vendor management module for storing vendor data and executing vendor related tasks; and
a client management module to storing client data and executing client related tasks.

3. The system of claim 1, further comprising a compliance update module for automatically tracking and implementing updates to compliance requirements.

4. The system of claim 1, further comprising:
at least one caching server; and
an unstructured database layer and a structured database layer coupled between the at least one caching server and an internet proxy server.

5. The system of claim 1, further comprising:
at least one caching server; and
a web services layer and a web layer coupled between the at least one caching server and an internet proxy server.

6. The system of claim 1, wherein automatically managing relationships between users of the system comprises managing multiple layers of relationships between vendors and clients, and wherein a vendor in one context may be a client in another context.

7. The system of claim 1, wherein the method further comprises a monitoring function comprising risk assessment, performance monitoring, and document collection, storage and exchange.

8. The system of claim 1, further comprising a shared monitoring hub through which vendors and clients are kept current on tasks, including performance monitoring, risk assessment, document archival, document exchange, and analytics.

9. The system of claim 1, wherein the method further comprises automatically deducing relationships between system users based on connections between users.

10. The system of claim 9, wherein the method further comprises organizing user connections and company connection separately by tagging data that is exchanged between users.

11. A computer-implemented method for a monitoring and information exchange network (MIEN), the method comprising:
at least one processor executing instructions to communicate between a MIEN system and various users of the system, wherein the various users include users of other systems whose processors and databases are automatically altered by the execution of the instructions, the instructions causing the performance of the method comprising, executing a plurality of user interface processes for enabling users to interact with the system;

executing a plurality of application programs interfaces (APIs) enabling multiple systems external to the system to interact with the system, including exchanging data and querying the at least one searchable database;

initiating connections between users of the system, wherein users of the system comprise individuals acting on behalf of corporate entities; and executing at least one module comprising a vendor module and a client module;

automatically managing relationships between users of the system, including storing communication history, automatically generating and exchanging data and data queries that are repeatedly required, and causing changes in databases and processor configurations of the at least one searchable database, the at least one processor, and databases and processors external to the system; and wherein automatically managing relationships further includes managing a history of individuals at the different corporate entities, maintaining a history of the relationships and a history of data inquiries.

12. The method of claim 11, further comprising validating the authenticity of users and validating the authenticity of corporate.

13. The method of claim 11, further comprising executing a request-for-content process, comprising:
determining whether the request is directed to a user who is connected to the system; and
if the user is connected to the system, sending the request to the user.

14. The method of claim 13, further comprising, if the user is not connected to the system, sending an invitation to the user and allowing the user to register with the system as a guest.

15. The method of claim 13, further comprising:
if the user is not connected to the system, sending an invitation to the user and allowing the user to register as a guest; and
if the user registers as a guest, creating a connection for the user to the system.

16. The method of claim 11, further comprising executing a content publication process, the process comprising:
determining whether a recipient for the content is connected to the system;
if the recipient is not connected to the system, determining whether the recipient exists in the system;
if the recipient exists in the system, sending the recipient an email requesting to view the content; and
if the recipient does not exist in the system, sending an invitation to the recipient to receive the content.

17. The method of claim 16, further comprising, if the recipient is connected to the system, determining whether the content is private, and setting access rules accordingly.

18. The method of claim 17, wherein access rules include expiration date, identification of watermarks, and authorized ability to download.

19. A non-transient computer readable medium having stored thereon instructions that when executed on a processor cause the performance of a monitoring and information exchange network method, the method comprising:
a plurality of user interface processes for enabling users to interact with the system;
a plurality of application programs interfaces (APIs) enabling multiple systems external to the system to interact with the system, including exchanging data and querying the at least one searchable database;

initiating connections between users of the system, wherein users of the system comprise individuals acting on behalf of corporate entities; and automatically managing relationships between users of the system, including storing communication history, automatically generating and exchanging data and data queries that are repeatedly required, and causing changes in databases and processor configurations of the at least one searchable database, the at least one processor, and databases and processors external to the system; and wherein automatically managing relationships further includes managing a history of individuals at the different corporate entities, maintaining a history of the relationships and a history of data inquiries, wherein the history of individuals comprises names of individuals, contact information of individuals, and a record of communications between pairs of individuals that interact one behalf of different corporate entities.

20. The non-transient computer readable medium of claim 19, wherein the method further comprises automatically tracking and implementing updates to compliance requirements.

21. The non-transient computer readable medium of claim 19, wherein the method further comprises a monitoring function comprising risk assessment, performance monitoring, and document collection, storage and exchange.

* * * * *